United States Patent [19]

Gottlob

[11] 4,447,034
[45] May 8, 1984

[54] VIBRATION DAMPING BASE
[75] Inventor: Clifford E. Gottlob, Arkansas City, Kans.
[73] Assignee: Gottlob Engine Conversions, Inc., Arkansas City, Kans.
[21] Appl. No.: 315,299
[22] Filed: Oct. 23, 1981
[51] Int. Cl.³ .......................................... F16M 13/00
[52] U.S. Cl. ..................................................... 248/634
[58] Field of Search .............. 248/634, 605, 606, 607, 248/678, 638, 613; 123/195 R, 195 A, DIG. 11, 1 R; 384/438, 428, 434, 441; 464/83, 89, 180; 74/16

[56] References Cited

U.S. PATENT DOCUMENTS

| | | | |
|---|---|---|---|
| 2,083,277 | 6/1937 | Scott. | |
| 2,565,473 | 8/1951 | Cline | 74/16 |
| 2,977,807 | 4/1961 | Conover | 74/16 |
| 3,531,070 | 9/1970 | Roddy | 248/606 |
| 4,025,131 | 5/1977 | Bergquist et al. | 384/428 |
| 4,084,860 | 4/1978 | Kohler et al. | 384/428 |

Primary Examiner—William H. Schultz
Assistant Examiner—Ramon O. Ramirez
Attorney, Agent, or Firm—Irvin A. Lavine

[57] ABSTRACT

A vibration damping base for an engine and shaft. A pair of spaced shaft bearings are coaxially supported in a pair of spaced, parallel plates. Upper and lower support arms are connected to the plates and extend transversely of the bearing axis. The support arms are tubes of rectangular cross-section which are engaged adjacent their ends by facing, U-shaped brackets having elastomeric linings. The support arms are connected to flanges of longitudinal beams forming part of the base and made of two channels. One support arm is welded at each end to a flange of a first channel which has surface engagement with a flange of a second channel.

23 Claims, 5 Drawing Figures

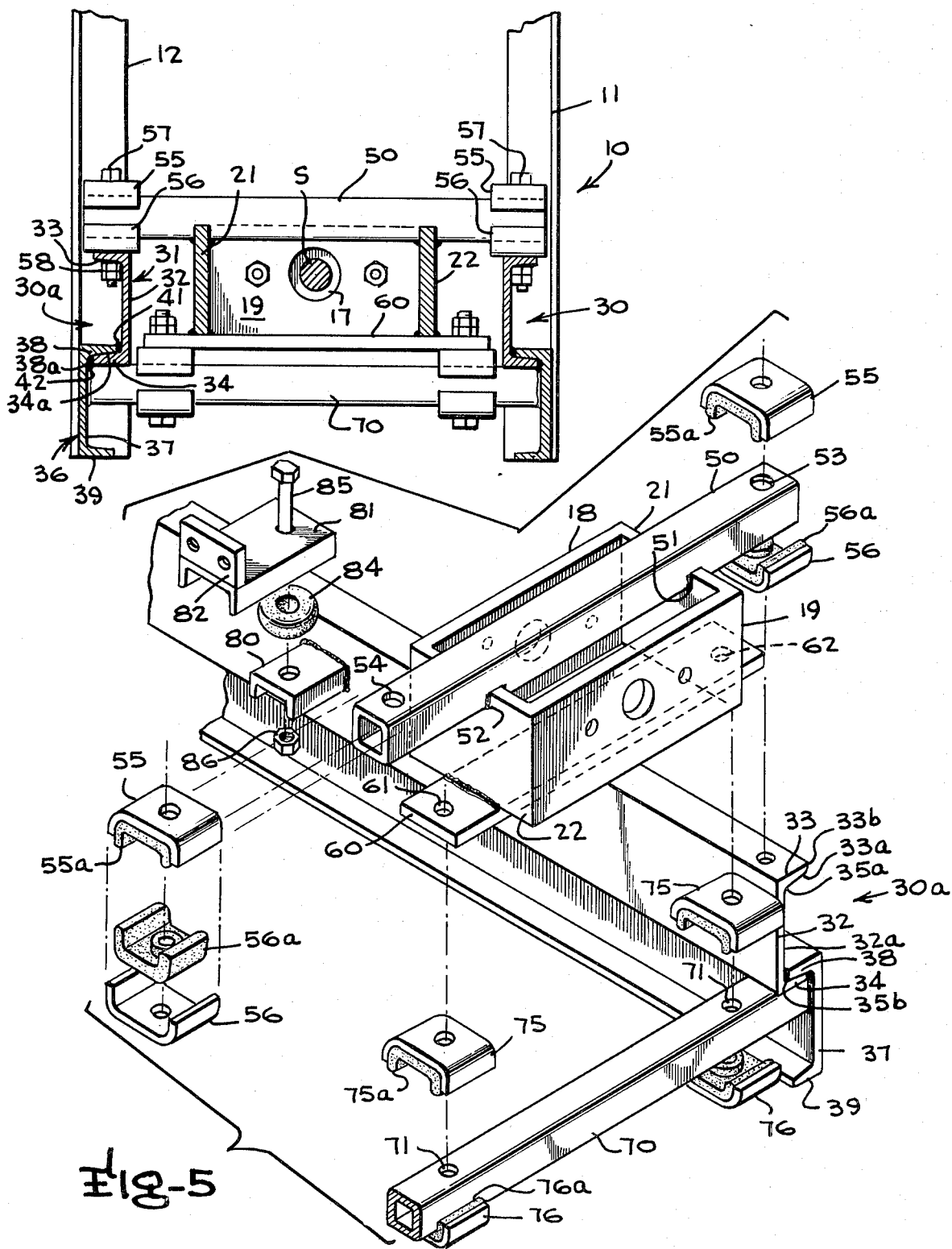

VIBRATION DAMPING BASE

TECHNICAL FIELD

The present invention relates to a vibration damping base, and more particularly to such a base and related structure for an engine and an output shaft connected to it.

BACKGROUND ART

Internal combustion engines include a crank shaft which delivers torque. The crank shaft is usually connected to an output shaft, either through a clutch or a transmission. It is necessary to support the engine and shaft, and in the prior art, various suggestions have been made for support structures, including some elastomeric, or rubber-like material placed between the ultimate supporting structure and the engine and the shaft. Such suggestions have generally been provided for automotive applications and, to a lesser extent, for engine testing applications. In such prior art, the principle concern has been with the reduction or elimination of vibrations which originate in the engine, so as to avoid transmission of these vibrations from the engine into the supporting structure, such as the automobile frame, and thence into the passenger compartment. In such environments, the vibrations are comparatively minor in nature, and do not usually prevail for substantial lengths of time. For example, in most automotive applications, the automobile is seldom driven without stopping for longer than eight or ten hours.

In general, the supporting structure between the frame and the engine has included an elastomeric body, usually placed in compression, but in some installations, the elastomeric body has been placed in tension. Such prior art suggestions have not been directed to the problem of isolating the engine from sustained cyclical vibrations imposed over a long period of time onto the engine from the load, and which cyclical vibrations are of substantial magnitude.

Among the known prior art relevant to vibration damping arrangements included in the mounting of engines are the following U.S. Pat. Nos.: Lord 2,028,549; Lord 2,028,551; Scott 2,083,277; Cline 2,565,473.

DISCLOSURE OF INVENTION

The present invention provides a vibration damping base and related supporting structure for an engine and the output shaft connected to it. Elastomeric bodies are placed between the engine and the output shaft, and the supporting base. The output shaft is journalled in a pair of spaced, coaxial shaft bearings, which are supported in a pair of spaced, parallel plates, which in normal operation are in vertical planes. The bearing support plates are connected by plates which lie parallel to the shaft. Upper and lower support arms are provided, connected to the base and to the plates which support the shaft bearings. In particular, a bearing plate extends transversely of the shaft beneath the support plate structure made up of the four noted plates, and is connected to a lower support arm, which, like the upper support arm, is a tube of rectangular cross section. A bracket structure is provided, including a pair of facing, U-shaped elastomeric material lined brackets, the elastomeric material of each bracket element engaging three surfaces of the support arm. A bolt passes through the two bracket elements, the support arm and the bearing plate. The upper support arm is welded to the connecting plates which connect the bearing support plates. The ends of the upper support arm are substantially encompassed by facing U-shaped brackets which are lined with elastomeric material, and bolts extend through the ends of the upper support arm, the U-shaped brackets, and through the base.

The base comprises a pair of longitudinal beams having flanges, and the support arms are connected to flanges of these beams, the upper support arm by bolts, and the lower support arm by welding. In particular the beams are each constructed of two channels, positioned so that a flange of one channel is in surface engagement with a flange of the other channel, and the webs are parallel. There is thus provided a flange structure of double flange thickness, the lower support arm being welded to one of the engaging flanges. Preferably, the channels face in opposite directions, and have their other flanges spaced apart by approximately the height of the two webs of the two channels.

The engine is supported on the base by a bracket which includes a body of elastomeric material in compression.

The vibration damping base is particularly suited for use where the engine is intended to drive a well pump, the mechanism including a large counterweight. The pump and the counterweight generate significant vibrational forces which are cyclical in nature, and since the engine operates the pump over extended periods of time without stopping, such as weeks and months, the duration of the vibrational forces is excessively long. These vibrational forces are transmitted from the pump and the counterweight, through the intervening mechanism, and thence into the shaft connected to the engine, thus subjecting the shaft, the engine and the base to these large, cyclical and long term vibrational forces. These forces tend to damage any structure which is subjected to them, and, in connection with the herein disclosed structure, tend to damage the base and the engine. This is particularly true where an engine having an aluminum block is utilized, since aluminum blocks have less resistance to vibrational and torsional forces than do engines having a cast iron block. Consequently, the herein disclosed construction provides the advantages of damping vibrations of the nature described which will emanate from mechanism other than the engine. The noted construction will damp both torsional forces on the bearing support plates, and the construction of the longitudinal beams of the base will damp vibrations imparted thereto.

BRIEF DESCRIPTION OF DRAWINGS

FIG. 4 is a cross sectional view taken on the line 4—4 of FIG. 2.

FIG. 5 is an exploded, perspective view of a portion of the structure shown in FIG. 4.

BEST MODE FOR CARRYING OUT THE INVENTION

Figure 1:
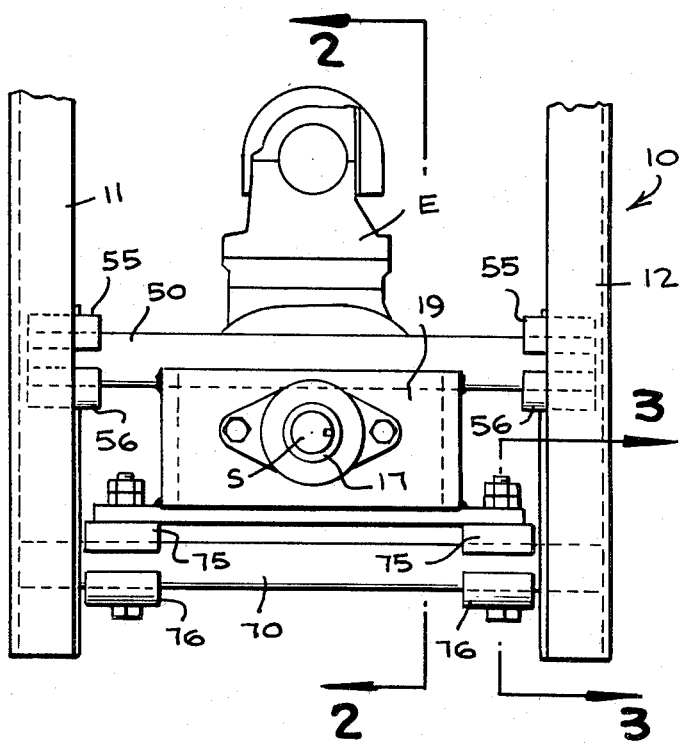
FIG. 1 is an end view of a vibration damping base in accordance with the present invention, with an engine and a shaft associated therewith.
Figure 2:
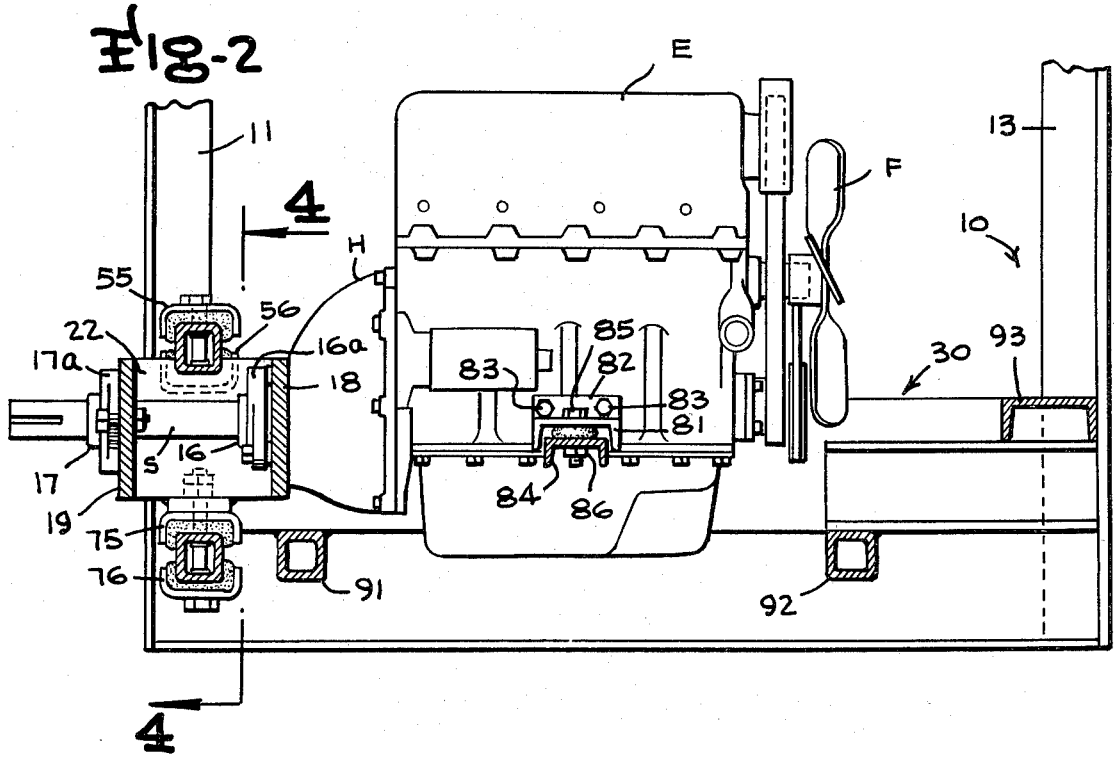
FIG. 2 is a cross sectional view taken on the line 2—2 of FIG. 1.

Referring now to the drawings, wherein like or corresponding reference numerals are used for like or corresponding parts throughout the several views, there is shown in FIG. 1 a vibration damping base 10 having engine E supported thereon. In addition, there is connected to the engine E an output shaft S. The base 10 comprises four upstanding corner posts, posts 11 and 12 being as shown in FIG. 1, there being as shown in FIG. 2 posts 11 and 13. These are preferably formed of angle irons.

Referring now to FIG. 2, there is shown the vibration damping base 10, with the engine E having the longitudinal axis thereof extending generally parallel to the longitudinal direction of base 10. The base 10 includes a longitudinal beam 30 extending between and connected to the posts 11 and 13, and a similar beam extends parallel to it, having one end connected to the post 12. The engine E is an internal combustion engine, preferably having an aluminum cylinder block. At its front, the engine is provided with a fan F, and at its rear, there is a bell housing H within which there is, in known fashion, a fly wheel, to which is joined a clutch, the clutch being connected to the output or drive shaft S. The drive shaft S is supported in a pair of shaft bearings 16 and 17 carried, respectively, in pillow blocks 16a and 17a. The bearings 16 and 17 are in spaced apart, coaxial and parallel relationship, being supported by the pillow blocks 16a and 17a, which are carried by a shaft support structure including plates 18 and 19 which are parallel to each other and extend transversely of the shaft S. The shaft bearing support structure includes, in addition to the first plate 18 and second plate 19, third and fourth plates 21 and 22 (see FIG. 4) which are parallel to each other and to the shaft S, and each of which is joined to the first and second plates 18 and 19. Thus, the third and fourth plates 21 and 22 serve to connect the bearing support plates 18 and 19.

Referring to FIG. 4, the vibration damping frame 10 will be seen to include the longitudinal beam 30, and a parallel, substantially identical longitudinal beam 30a. As shown in FIGS. 4 and 5, the longitudinal beam 30a includes an upper channel 31 comprising a transverse web 32, an upper flange 33 and a lower flange 34 in spaced, parallel relation to flange 33. Flange 33 has an inclined inner surface 33a, and a free edge 33b. The web 32 has an inner surface 32a. The inner surfaces of the two flanges 33 and 34 and of the web 32 do not intersect, but are connected by an upper radius 35a and a lower radius 35b. A lower channel 36 is of substantially the same shape, and is preferably the same size as the upper channel 31, and will be seen to include a web 37, an upper flange 38 and a lower flange 39. The channels 31 and 36 are faced in opposite directions. The inner surface 34a of the flange 34 of upper channel 31 engages the inner surface 38a of upper flange 38 of the lower channel 36. The free or outer edge of flange 34 is placed substantially at the juncture of the radius joining the inner surface of flange 38 with the inner surface of web 37, and similarly the free edge of flange 38 is placed at the juncture of the inner surface of flange 34 and the radius which connects it with the inner surface of web 32. Thus, the inner surfaces of the webs 34 and 38 are in substantial surface engagement with each other. The webs 32 and 37 are substantially parallel.

The channels 31 and 36 are secured together by welding, and as shown in FIG. 4, there is welding 41 provided at the free edge of flange 38, and welding 42 provided at the free edge of flange 38, occupying a small groove formed by the free edge of flange 38, the inner surface of web 32, and the radius between the inner surface of flange 34 and the inner surface of web 32. This is herein referred to as a "fillet weld". A similar fillet weld 42 is placed at the free edge of flange 34, between it and the inner surface of web 37, and engaging the radius between the inner surface of flange 38 and web 37. The welds 41 and 42 are each intermittent welds, and are placed in staggered, overlapping relationship.

Referring to FIG. 5, to connect the bearing support plates 18 and 19 to the longitudinal beams, there is provided an upper support arm 50 which is of hollow, rectangular cross section, support arm 50 preferably being square in cross section, thereby having two sets of surfaces at right angles to each other. The plates 21 and 22 are provided with cut-outs 51 and 52, respectively, into which the upper support arm 50 is placed, being joined to the plates 21 and 22 by welding. The support arm 50 extends substantially beyond the plates 21 and 22, and is provided with vertical openings 53 and 54 adjacent the ends thereof. A pair of facing, U-shaped brackets 55, 56 are provided, each lined with an elastomeric body 55a and 56a, the elastomeric bodies also being U-shaped, thereby each providing three surfaces which engage three surfaces of the upper support arm 50. As seen in FIG. 1, a pair of such U-shaped brackets 55, 56 are positioned adjacent each end for the upper support arm 50, and as seen in FIG. 2, these brackets substantially encompass the support arm 50. Since the support arm 50 is of rectangualar, specifically square, cross section, all four of its sides are engaged by the elastomeric bodies 55a, 56a of the brackets 55, 56. To secure the upper support arm 50 to the longitudinal beams 30, 30a, bolts 57 extend through the openings 53, 54 in upper support arm 50, and through openings in the U-shaped brackets 55, 56, and also through the upper flanges of the longitudinal beams 30, 30a. Specifically, as shown in FIGS. 4 and 5, a bolt 57 will extend through the flange 33, and is secured in position by nuts 58. The nuts 58 are turned so as to draw down the bolt 57, thereby placing the elastomeric bodies 55a, 56a of the U-shaped brackets 55, 56 in compression.

Referring to FIGS. 4 and 5, a bearing plate 60 is shown extending transversely of the plates 21 and 22, and welded thereto. Holes 61, 62 are provided in the bearing plate 60 adjacent the ends threrof. A lower support arm 70 extends below and parallel to upper support arm 50. Like upper support arm 50, it is preferably of square shape, and is of hollow, tubular formation. As shown in FIG. 4, the ends of lower support arm 70 are joined to the longitudinal beams 30, 30a by welding; specifically lower support arm 70 is joined to the bottom surface of the lower flanges of the upper channels, such as flange 34 of upper channel 31. Welding may also be provided to connect the lower support arm 70 to the inner surface of the web of the lower channel of each beam 30, 30a. Thus, the lower support arm 70 is connected to the longitudinal beams at the part thereof which provides double flange thickness.

Figure 3:
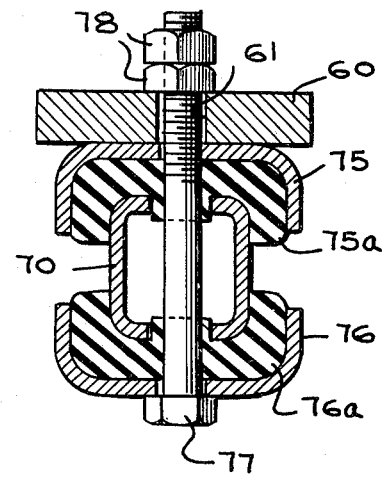
FIG. 3 is a cross sectional view taken on the line 3—3 of FIG. 1.

To connect the bearing plate 60, and thus the bearing support plates 18 and 19, to the lower support arm 70, and thus to the longitudinal beams of the base 10, there are provided a pair of U-shaped brackets 75,76 having, respectively, U-shaped elastomeric bodies 75a, 76a therewithin. The brackets 75,76 are substantially identical in construction to the brackets 55, 56. As shown in FIG. 3, three sides or surfaces of the lower support arm 70 are engaged by three surfaces of elastomeric body 75a, and three sides or surfaces of lower support arm 70 are also engaged by three surfaces of elastomeric body 76a. Thus, the brackets 75, 76 together substantially encompass the support 70. A bolt 77 extends through openings in the brackets 75 and 76, and through holes 71 in lower support arm 70. The bolt 77 also extends through the hole 61 of support plate 60, the bolt being engaged by nuts 78 which may serve to draw the bolt 77 so as to place the elastomeric bodies 75a and 76a in compression.

The shaft bearings 16 and 17 will thereby be seen to be supported by the bearing plates 18 and 19, which are connected or joined by the plates 21 and 22, thereby forming a support structure for the shaft bearings. The support structure is joined to the longitudinal beams 30, 30a by a structure which includes, as a part thereof, brackets which are intermediate the support structure for the shaft bearings and the longitudinal beams 30, 30a, and which brackets include elastomeric bodies. As a result, where vibrations are transmitted from the load driven by the engine E into the shaft S, those vibrations are damped by the herein above noted construction. More particularly, vibrational forces in the shaft S are transmitted into the base 10 through the two sets of brackets 55, 56 on upper support arm 50 and through the two pairs of brackets 75, 76 on lower support arm 70. Further, due to the construction of the longitudinal beams 30, 30a, such cyclical vibrations which may pass into lower support arm 70 are transmitted into the longitudinal beams 30, 30a through the double thickness of the engaging flanges, such as flanges 34 and 38, and this construction further serves to damp vibrations and absorb them. In addition, of course, the vibrations from the shaft S may be transmitted into the upper support arm 50, and damped by the brackets 55, 56, remaining vibrations passing into the upper flanges of the longitudinal beams 30, 30a such as upper flanges 33.

This noted construction whereby damping of the vibrations from the load is achieved, is of particular significance where the engine E is to be protected from vibrations generated by the driven load, such as the counterweight and pump of a well, and such vibration damping construction is particularly important where the engine E is provided with an aluminum block.

Referring to FIG. 5, there is shown welded to the web 32 an engine bracket support 80, above which is an engine bracket 81, the latter having a plate 82 with openings through it. Bolts 83 (see FIG. 2) pass through the openings of engine bracket 81, into the engine E. An annular elastomeric body 84 is provided between the engine bracket 81 and the engine bracket support 80, and a bolt 85 passes through the engine bracket 81, elastomeric body 84 and engine bracket support 80, having a nut 86 threaded thereon. The elastomeric body 84 is placed in compression by bolt 85 and nut 86.

The support structure for the engine E, including engine bracket 81 and engine support bracket 80 primarily serves to support the engine E and to damp vibrations which might otherwise be transmitted between the engine E and the base 10. Consequently, both the engine E and the shaft S are supported in a manner so as to damp vibrations, both any vibrations which might be generated in the engine E, but of even greater significance, those vibrations which are generated by the driven load, such as the pump and counterweight of a well, preventing such vibrations from reaching the engine E. The base 10 includes the longitudinal beams, which are constructed in a manner so as to provide the above-noted double thickness of flanges, in engaging relationship, which serves to dampen vibrations, including particularly cyclical vibrations, which enter the longitudinal beams 30, 30a of the base 10.

As shown in FIG. 2, other transverse members are provided, extending between the longitudinal beams, and may include the square hollow tubes 91 and 92, and the channel 93.

There has been provided a base for an engine and an output shaft connected to it which greatly reduces vibrations imparted into the shaft from a driven load, such as a load which will impose continuous, cyclical and strong vibrations to the shaft connected to the engine. The damping of these vibrations is effected by a shaft bearing support structure which is connected into a base through vibration damping brackets, and more particularly through a pair of arms engaged by vibration absorbing brackets intermediate the bearing support structure and the base. The herein provided vibration damping frame protects the engine from vibrational forces, including twisting, and serves to damp all vibrations including harmonic vibrations which might otherwise be of such strength as to cause damage to the structure, including to the engine.

It will obvious to those skilled in the art that various changes may be made without departing from the spirit of the invention and therefore the invention is not limited to what is shown in the drawings and described in the specification but only as indicated in the appended claims.

I claim:

1. A vibration damping base for an engine and an output shaft connected to it comprising:
 a supporting base,
 means for mounting an engine on said base,
 shaft bearing means, and means for supporting said shaft bearing means comprising:
  (a) plate means having said shaft bearing means mounted therein,
  (b) support arm means connected to said plate means and extending transverse to the axis of said shaft bearing means, and
  (c) means for connecting said support arm means to said supporting base comprising;
   (i) bracket means substantially encompassing said support arm means adjacent the ends thereof, said bracket means comprising elastomeric material engaging said support arm means, and
   (ii) means for securing said bracket means, said support arm means and said supporting base.

2. The base of claim 1, wherein said support arm means comprises a support arm having angularly related longitudinally extending surfaces, and said bracket means having angularly related surfaces engaging said surfaces of said support arm.

3. The base of claim 2, said support arm having surfaces at right angles to each other.

4. The base of claim 3, said support arm means being of rectangular cross section, said bracket means comprising first and second U-shaped brackets, said brackeets facing each other.

5. The base of claim 1, 2 or 4, said securing means comprising longitudinal fastener means extending through said support arm means, said bracket means and said base.

6. The base of claim 1, said support arm means comprising first and second spaced support arms, each said support arm having ends spaced from said plate means.

7. The base of claim 6, said support arm means extending horizontally.

8. The base of claim 7, said base comprising longitudinal beams, said beams comprising first horizontal flange means, said securing means comprising bolt means extending through a said support arm, said bracket means and said flange means.

9. The base of claim 6 or 7, said beams comprising first and second joined channels providing second horizontal flange means comprising a flange of a first channel of said beam in engagement with a flange of a second channel of said beam, said securing means comprising weld means for securing said second support arm to said second horizontal flange means, and further comprising bolt means for securing said bracket means to said second support arm.

10. The base of claim 1, said means for mounting said engine on said base comprising engine bracket means including an elastomeric load bearing element.

11. The vibration damping base of claim 1, wherein said shaft bearing means comprises first and second axially spaced, aligned shaft bearings, and wherein said plate means comprises first and second parallel plates each supporting a said shaft bearing therein.

12. The vibration damping base of claim 11, and further comprising third andd fourth plates parallel to each other and perpendicular to said first and second plates, and means connecting said first and second plates to said third and fourth plates.

13. The vibration damping base of claim 12, and means connecting said third and fourth plates to said support arm means.

14. The vibration damping base of claim 13, wherein said support arm means comprises first and second vertically spaced support arms, said support arms connected to said third and fourth plates and extending transversely thereof.

15. The vibration damping base of claim 14, said base comprising parallel longitudinal beams, each comprising horizontal flange means, said securing means comprising bolt means extending through said first support arm, said bracket means and said flange means.

16. The vibration damping base of claim 13, said base comprising parallel longitudinal beams each comprising a pair of channels having a web and flanges, means joining said channels with a flange of one channel in surface engagement with a flange of the other channel, and with their webs parallel, and said support arm means comprising a support arm, said securing means comprising means securing said support arm to a said engaged flange of each of said longitudinal beams, and means securing said support arm to said third and fourth plates.

17. The vibration damping base of claim 16, said beams each comprising an additional flange vertically spaced from said engaging flanges, said support arm means further comprising an additional support arm vertically spaced from said first mentioned support arm and connected to said third and fourth plates.

18. The vibration damping base of claims 1, 13 or 16, said means for mounting an engine on said base comprising engine bracket means including an elastomeric load bearing element.

19. A vibration damping base for an engine and an output shaft connected to it comprising:
(a) a supporting base comprising first and second longitudinal beams,
(b) a pair of spaced, coaxial shaft bearings,
(c) support means for said shaft bearings comprising:
(i) a pair of spaced, parallel bearing support plates, and
(ii) means joining said support plates,
(d) a pair of vertically spaced support arms,
(e) means for connecting said pair of support arms to said shaft bearing support means,
(f) means for connecting said pair of support arms to said beams,
(g) said connecting means for connecting said pair of support arms to said beams comprising bracket means between said shaft bearing support means and said beams substantially encompassing each said support arm and including elastomeric means in engagement with said support arms.

20. The vibration damping base of claim 19, and further comprising engine bracket means, means connecting said engine bracket means to said beams, and means including elastomeric engine load supporting means for connecting an engine to said engine bracket means.

21. The vibration damping base of claim 19 or 20, each said longitudinal beam comprising first and second channels each having flanges and a web, means joining said channels of each beam with a flange of each channel in surface engagement with a flange of the other channel and with the webs parallel, said means for connecting support arms to said beams comprising means joining the ends of one said support arm to a said engaging flange of each said beam.

22. The vibration damping base of claim 19, said support means for said shaft bearing further comprising a bearing plate extending transversely of said shaft and adjacent of said support arm, said bracket means including facing U-shaped brackets, said bearing plate engaging a portion of said brackets, said connecting means comprising fastener means connecting said bearing plate and said U-shaped brackets to the support arm adjacent to said bearing plate.

23. The vibration damping base of claim 19, wherein said means for connecting one said support arm to said shaft bearing support means comprises welding, and wherein said bracket means comprises facing, U-shaped brackets engaging said last mentioned support arm, said connecting means comprising fastener means connecting said last mentioned support arm and the engaging brackets to said beams.

* * * * *